United States Patent
McGrady et al.

(10) Patent No.: US 8,726,565 B2
(45) Date of Patent: May 20, 2014

(54) SHEET MULCH ASSEMBLY FOR AN AGRICULTURAL DRIP IRRIGATION SYSTEM

(75) Inventors: Michael John McGrady, Carlsbad, CA (US); William Adak Ratzburg, Moline, IL (US)

(73) Assignee: Deere & Company, Moline, IL (US)

( * ) Notice: Subject to any disclaimer, the term of this patent is extended or adjusted under 35 U.S.C. 154(b) by 1531 days.

(21) Appl. No.: 11/512,827

(22) Filed: Aug. 30, 2006

(65) Prior Publication Data
US 2008/0072480 A1    Mar. 27, 2008

(51) Int. Cl.
*A01C 1/04*    (2006.01)
(52) U.S. Cl.
USPC ................................................ 47/56; 47/9
(58) Field of Classification Search
USPC .......... 47/21.1, 62 E, 48.5, 956, 79; 111/199, 111/200, 900
See application file for complete search history.

(56) References Cited

U.S. PATENT DOCUMENTS

| | | | |
|---|---|---|---|
| 3,362,106 A * | 1/1968 | Goldring | 47/56 |
| 3,848,359 A | 11/1974 | Seith et al. | |
| 3,888,197 A | 6/1975 | Seith et al. | 111/1 |
| 5,785,785 A * | 7/1998 | Delmer et al. | 156/203 |
| 5,951,202 A | 9/1999 | Brown | |
| 6,619,565 B1 | 9/2003 | Abbott | 239/273 |
| 6,835,761 B2 | 12/2004 | Harrison | 523/132 |
| 6,996,932 B2 * | 2/2006 | Kruer et al. | 47/48.5 |
| 2002/0132884 A1 | 9/2002 | Offerman | 524/35 |
| 2003/0213171 A1 | 11/2003 | Kruer et al. | |
| 2007/0243019 A1 | 10/2007 | Baker | |

FOREIGN PATENT DOCUMENTS

| | | |
|---|---|---|
| DE | 94 13 194.5 | 8/1994 |
| DE | 196 23 339 C1 | 6/1996 |
| EP | 1 430 770 A1 | 6/2004 |
| JP | 02007222034 A * | 9/2007 |

* cited by examiner

*Primary Examiner* — Trinh Nguyen

(57) ABSTRACT

A sheet mulch assembly includes a sheet mulch; an irrigation conduit attached to and carried by the sheet mulch; and at least one carrier substrate coupled with the conduit. Each carrier substrate carries at least one seed.

10 Claims, 3 Drawing Sheets

SHEET MULCH ASSEMBLY FOR AN AGRICULTURAL DRIP IRRIGATION SYSTEM

FIELD OF THE INVENTION

The present invention relates to agricultural irrigation systems, and, more particularly, to agricultural drip irrigation systems.

BACKGROUND OF THE INVENTION

Agricultural irrigation systems have been used for centuries to apply water to agricultural crops. The first type of irrigation systems were flood irrigation systems in which trenches formed in the soil directed water via gravitational force to an agricultural site. For example, water can be diverted from a river by a gated trench to an agricultural site at a lower elevation. These type of irrigation systems are still in use today in certain areas where water sources and the topography allow, e.g., certain areas of the western U.S.A. and Australia.

Other more mechanized types of irrigation systems are also used. For example, center pivot irrigation systems of the high pressure or low pressure type receive water from an electric powered water pump. The water typically is pumped from a well, river or irrigation pond. Intermittently spaced towers carrying a supply pipe are driven by electric motors or water driven turbines.

Other types of irrigation systems such as "travelers" are also used. In a traveler system, a flexible hose is coupled with a standpipe in a field supplied by a water pump, and a cable is drawn across the field. The water passes through a water driven turbine prior to exiting from a pivoting gun, and the water turbine reels up the cable on a spool, causing the traveler to move across the field dragging the hose behind.

With a center pivot or traveler irrigation system as described above, an appreciable amount of the water is lost through evaporation as the water travels through the air, and through run-off after the water falls to the ground. To reduce evaporation, such irrigation systems may be operated at night. However, depending upon the amount of acreage to irrigate, it may be necessary to operate the irrigation system around the clock, 7 days a week.

Another more recent type of irrigation is drip irrigation, in which water flows at a low pressure (e.g., typically 5 to 15 psi) through a flattened tube and is discharged through openings in the tube in close proximity to the plants. The water exits at a low pressure from the flattened tube, and is thus also referred to as a "drip tape." A supply header receives water from a water pump and a plurality of the drip tapes are coupled with the supply header in a network of drip tapes corresponding to the particular shape of the field.

A drip irrigation system as described above has the advantages of directly delivering water and nutrients to an area in close proximity to the plants which maximizes plant growth and production, while limiting problems associated with other types of irrigation systems, such as erosion, disease, weed growth, soil saturation, energy costs and water conservation.

It is also known to provide sheet mulch over the soil in the production of fruit and vegetable crops for weed control, plant growth enhancement via solarization (warming) of the soil, extension of the growing season allowing for double and triple crops, reduction of pest infestation, efficient fumigation, moisture retention, improved irrigation efficiency, reduction in labor needed for crop production, increased crop yield, enhanced crop quality, prevention of soil erosion, prevention of nutrient leaching and reduction in crop rot by minimizing contact with soil.

Sheet mulch may be permeable such as a woven mesh, or non-permeable such as non-perforated plastic sheeting. The plastic sheeting may be of different colors such as black to increase the soil temperature, white to reflect light, or red which has been shown to speed plant growth and increase yields. Additionally, the plastic sheeting may be non-biodegradable and removed after the growing season, or biodegradable and left to rot and enrich the soil. For example, certain types of polymeric and polyester plastics are biodegradable.

It is also known to use a drip irrigation system with sheet mulch. The drip tape can be laid on top of the seed bed and the sheet mulch applied over the drip tape. Alternatively, the drip tape can be bonded to the sheet mulch and laid over the seed bed as an integral assembly which saves time. The sheet mulch can further carry a seed tape or individual seeds, further saving time during planting.

Even with an integrated sheet mulch assembly as described above including drip tape and a seed tape, the sheet mulch carries the seeds and the drip tape is spaced laterally apart from the seeds. The water therefore must saturate the soil to an extent that the soil at the seed tape which is laterally spaced from the drip tape becomes moist. Prior to the seed germinating, the seeds are positioned at approximately the same level as the laterally spaced drip tape, and excess water may need to be applied to saturate the soil for proper germination. Even after the seed germinates and the roots grow, the water still must travel laterally for watering of the plant.

What is needed in the art is a sheet mulch assembly which is easy to install, provides proper seed spacing, and accurate application of water and nutrients without overwatering the area under the sheet mulch.

SUMMARY OF THE INVENTION

The invention comprises, in one form thereof, an agricultural irrigation assembly, including an irrigation conduit and at least one carrier substrate coupled with the conduit. Each carrier substrate carries at least one seed.

The invention comprises, in another form thereof, a sheet mulch assembly including a sheet mulch; an irrigation conduit attached to and carried by the sheet mulch; and at least one carrier substrate coupled with the conduit. Each carrier substrate carries at least one seed.

DETAILED DESCRIPTION OF THE INVENTION

Figure 1:
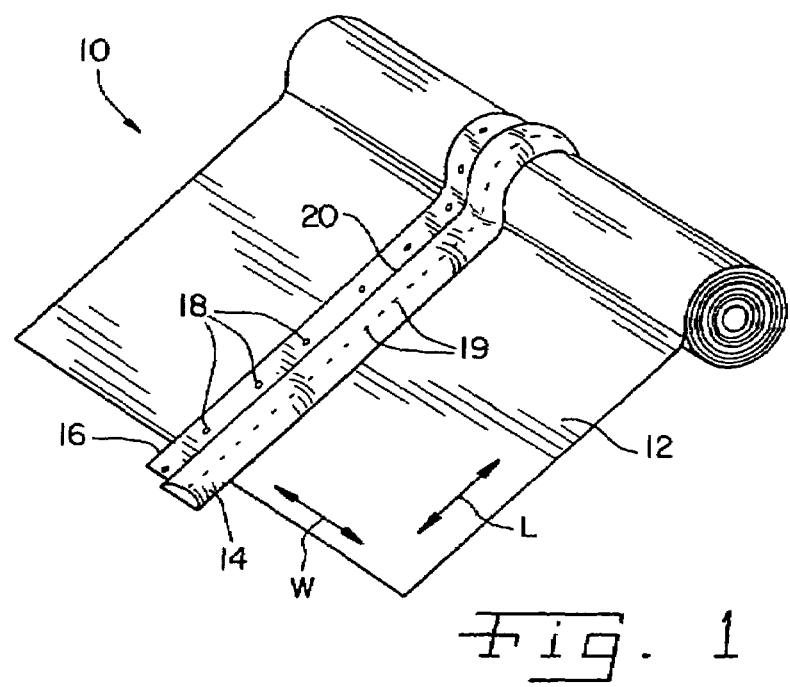
FIG. 1 is a perspective view of an embodiment of a sheet mulch assembly of the present invention.
Figure 2:
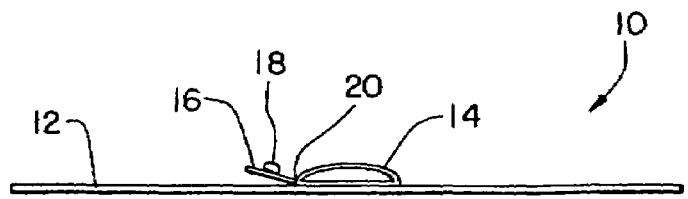
FIG. 2 is an end view of the sheet mulch assembly shown in FIG. 1.

Referring now to the drawings, and more particularly to FIGS. 1 and 2, there is shown an embodiment of a sheet mulch assembly 10 of the present invention which generally includes a sheet mulch 12, drip tape 14, and carrier substrate 16 carrying a plurality of seeds 18.

Sheet mulch 12 has a longitudinal expanse "L" and a width "W". Preferably, sheet mulch 12 has a longitudinal expanse L corresponding to the length of a prepared seed bed, although it is also possible to join 2 or more sheets of sheet mulch 12 in an end-to-end manner, slightly overlapping the ends of adjacent sheets and fluidly interconnecting longitudinally adjacent drip tapes 14. Similarly, sheet mulch 12 preferably has a width W corresponding to the width of a prepared seed bed.

Sheet mulch 12 can be a woven or non-woven sheet mulch, permeable or impermeable, and biodegradable or non-biodegradable. For example, sheet mulch 12 can be formed from cellulose, cellulose derivatives, or plastic. Preferably, sheet mulch 12 is formed from a biodegradable plastic. Without limitation, examples of such plastics include polymeric and polyester materials of many specific types.

Drip tape 14 defines an irrigation conduit with a plurality of longitudinally spaced perforations 19, and may itself be of known construction. Although drip tape 14 has a flattened, tape-like construction, it is possible to use other types of irrigation conduits with the present invention which are also known to be used in drip irrigation systems, such as irrigation conduits having oval or circular cross sections. In FIGS. 1 and 2, drip tape 14 is shown on top of sheet mulch 12 for ease of illustration and discussion; however, it will be appreciated that sheet mulch 12 is flipped over and drip tape 14 is actually positioned under sheet mulch 12 during use.

Drip tape 14 has a length which is approximately the same as the longitudinal expanse L of sheet mulch 12, and extends along the longitudinal expanse L of sheet mulch 12. Drip tape 14 is shown centered on the width W of sheet mulch 12, but may also be offset relative to the center of sheet mulch 12. Further, a single drip tape 14 is shown attached to sheet mulch 12, but it is also possible to attach two or more drip tapes to sheet mulch 12. In the latter case, the multiple drip tapes 14 would likely be spaced apart a suitable distance and jointly centered on sheet mulch 12.

Drip tape 14 is attached to sheet mulch 12 using suitable attachment methods, such as adhesive bonding, ultrasonic welding, heat welding, etc. The attachment may either be continuous (e.g., weld bead) or intermittent (e.g., spot welded). Further, rather than being a separate structure which is attached to sheet mulch 12, drip tape 14 can be integrally formed with sheet mulch 12. For example, sheet mulch 12 can be formed with two layers which are joined together, with each layer defining half of drip tape 14.

Drip tape 14 is preferably formed from a biodegradable plastic. Without limitation, examples of such plastics include polymeric and polyester materials of many specific types.

Carrier substrate 16 is attached directly to drip tape 14 and carries one or more seeds 18. Carrier substrate 16 may be attached to drip tape 14 on the same side as perforations 19 and/or a side opposite from perforations 19. In one embodiment shown more particularly in FIGS. 2 and 3, carrier substrate 16 is in the form of a seed tape which is attached to drip tape 14. More particularly, seed tape 16 has a length which is approximately the same as drip tape 14, and includes a longitudinal edge 20 which is attached along the length thereof to drip tape 14, such as by adhesive bonding. Seed tape 16 is in the form of a polyvinyl alcohol film which carries seeds 18, either on the surface of the film or encapsulated within the film. Seed tape 16 may be formed from other suitable types of materials, preferably biodegradable, such as unsized Kraft paper, etc.

Figure 4:
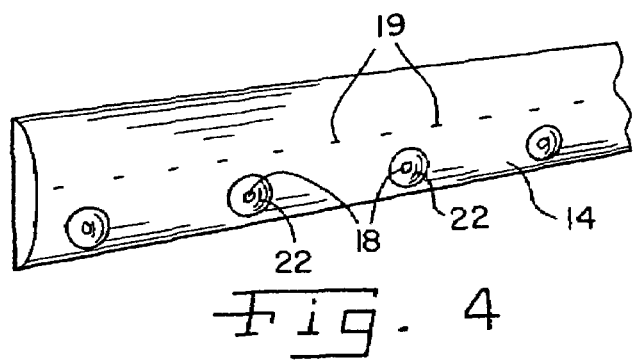
FIG. 4 is a perspective view of another embodiment of an agricultural irrigation assembly which may be used with the sheet mulch assembly shown in FIGS. 1 and 2.

Referring now to FIG. 4, another type of carrier substrate 22 is shown which is in the form of a plurality of discrete bodies intermittently spaced along drip tape 14. The shape and material of the discrete bodies may vary. In the embodiment shown, the discrete bodies are in the form of glycerin caps, each carrying one or more seeds, which are attached to drip tape 14 on a four inch spacing. The glycerin relatively quickly degrades when exposed to moist soil, exposing the seed to the soil for germination.

Figure 5:
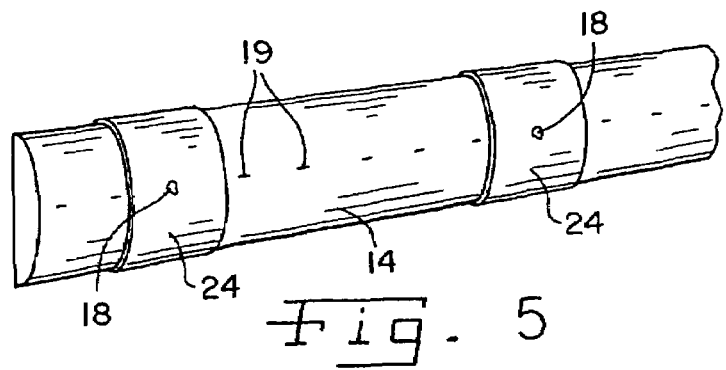
FIG. 5 is a perspective view of yet another embodiment of an agricultural irrigation assembly which may be used with the sheet mulch assembly shown in FIGS. 1 and 2.

Referring now to FIG. 5, another type of carrier substrate 24 is shown which is in the form of a plurality of belts intermittently spaced along drip tape 14. In the embodiment shown, belts 24 are in the form of polyvinyl alcohol belts, each carrying one or more seeds, which are attached to drip tape 14 on a twelve inch spacing. Each belt 24 is wrapped around drip tape 14 and the ends of the belt are joined together. Alternatively, the ends of each belt 24 can be attached to drip tape 14.

Figure 3:
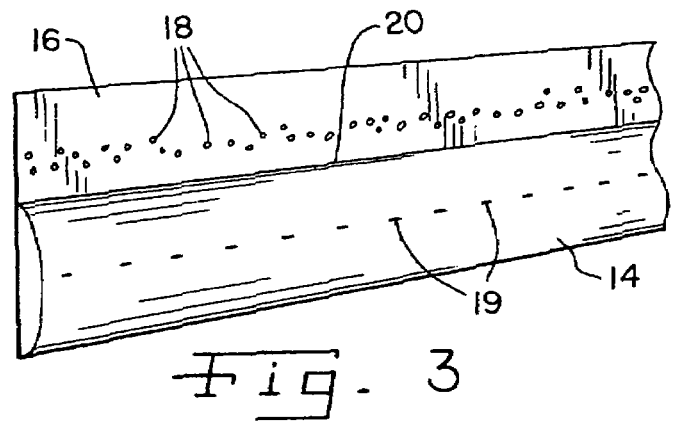
FIG. 3 is a perspective view of an embodiment of an agricultural irrigation assembly which may be used with the sheet mulch assembly shown in FIGS. 1 and 2.

As will be appreciated from FIGS. 3-5, a drip tape 14 carrying different types of carrier substrates 16, 22 or 24 need not be directly attached to sheet mulch 12. Rather, drip tape 14 with carrier substrate 16, 22 or 24 may be placed on the seed bed and sheet mulch 12 thereafter placed over the top of drip tape 14. Drip tape 14 and attached carrier substrate 16, 22 or 24 therefore define an agricultural irrigation assembly which may be used with a separate sheet mulch 12, or perhaps even without a sheet mulch 12.

Figure 6:
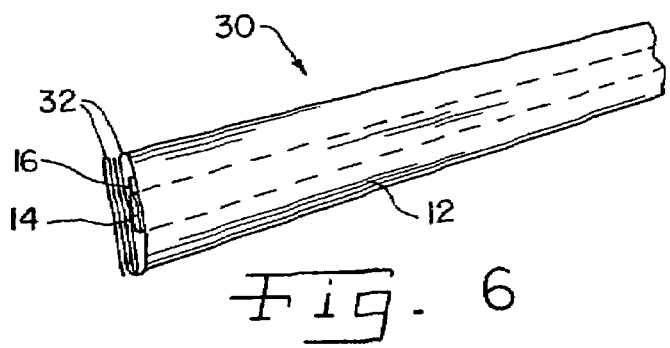
FIGS. 6-8 illustrate another embodiment of a sheet mulch assembly of the present invention.
Figure 7:
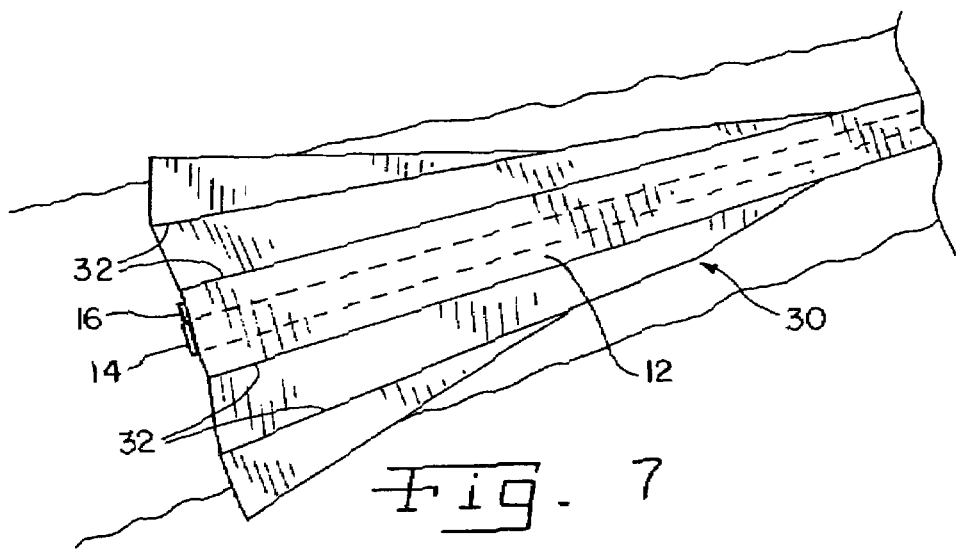
Figure 8:
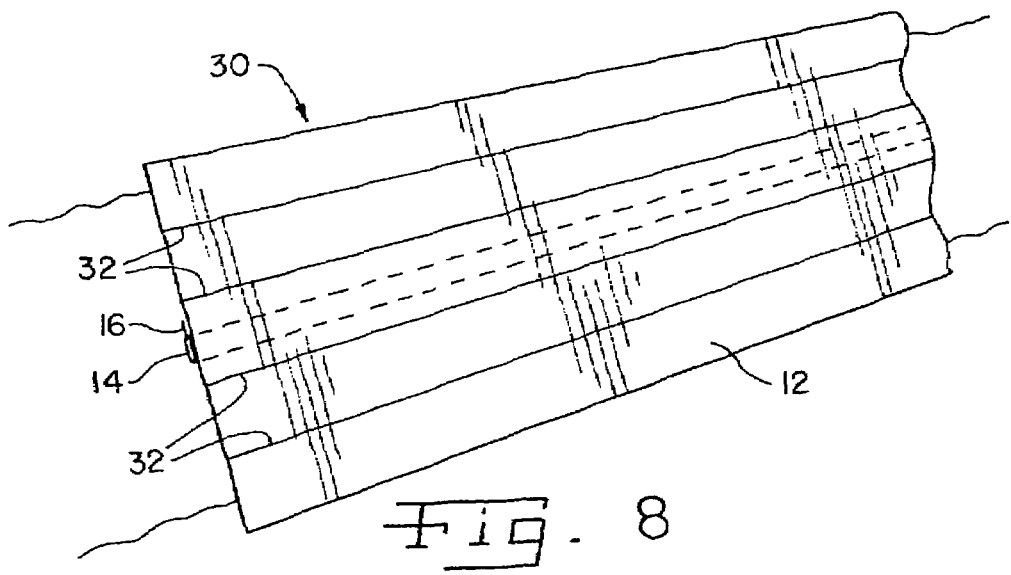

Referring now to FIGS. 6-8, another embodiment of a sheet mulch assembly 30 is shown. In this embodiment, sheet mulch 12 has an accordion structure with a plurality of folds 32 (FIG. 6) prior to final placement on the seed bed. The sheet mulch 12 is unfolded over the seed bed (FIG. 7) and has a width covering the seed bed when in the unfolded state (FIG. 8).

During use, sheet mulch 12 is unrolled or unfolded over the seed bed such that drip tape 14 and attached carrier substrate 16 are exposed at the bottom side adjacent to the soil. A plurality of sheet mulch assemblies 10 or 30 are likely arranged generally parallel to each other over adjacent seed beds. The drip tapes from each sheet mulch assembly are then fluidly connected to a water supply header at one end of the seed beds, and water is supplied at low pressure to drip tapes 14. Since the carrier substrates 16, 22 or 24 are directly attached to and thus in very close proximity to the drip tape, the amount of water necessary to saturate the soil around the seeds for germination is reduced. Further, after germination, water and nutrients can be more directly applied to the roots of the plant for intake and plant growth. After harvest, the entire sheet mulch assembly 10 or 30 is preferably made from a biodegradable material so that the entire assembly decomposes and enriches the soil, also eliminating labor costs associated with removal and disposal of the sheet mulch assemblies.

Having described the preferred embodiment, it will become apparent that various modifications can be made without departing from the scope of the invention as defined in the accompanying claims.

The invention claimed is:
1. An agricultural irrigation assembly, comprising:
an irrigation conduit; and
at least one carrier substrate, each said carrier substrate being directly attached to said conduit along an entire length of said carrier substrate, each said carrier substrate carrying a plurality of seeds mounted to an exterior surface thereof for direct contact with soil which is exterior to said agricultural irrigation assembly.

2. The agricultural irrigation assembly of claim 1, wherein each said carrier substrate comprises a seed tape attached to said conduit.

3. The agricultural irrigation assembly of claim 2, wherein each said seed tape has a longitudinal edge attached to said conduit.

4. The agricultural irrigation assembly of claim 3, wherein each said seed tape is comprised of polyvinyl alcohol.

5. The agricultural irrigation assembly of claim 1, wherein each said carrier substrate comprises a discrete body attached to said conduit.

6. The agricultural irrigation assembly of claim 1, wherein said carrier substrate is biodegradable.

7. The agricultural irrigation assembly of claim 6, wherein said carrier substrate is comprised of one of a polymeric and polyester material.

8. The agricultural irrigation assembly of claim 1, wherein said conduit is biodegradable.

9. The agricultural irrigation assembly of claim 8, wherein said conduit is comprised of one of a polymeric and polyester material.

10. The agricultural irrigation assembly of claim 1, further including an elongate plastic sheet mulch, said irrigation conduit attached to and carried by said sheet mulch.

* * * * *